Patented Feb. 2, 1954

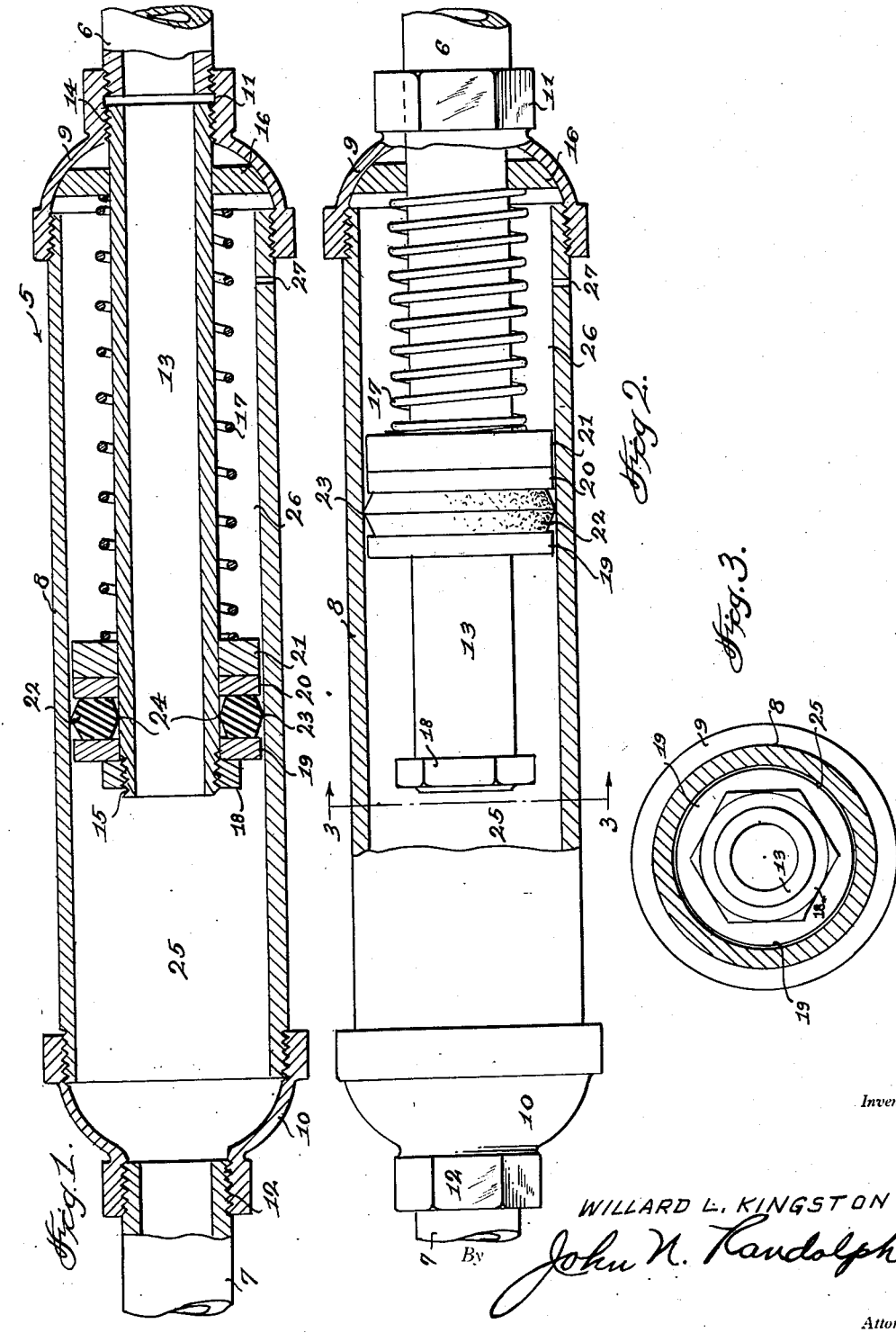

2,667,899

UNITED STATES PATENT OFFICE 2,667,899

EXPANSION JOINT FOR PIPE LINES

Willard L. Kingston, Lucerne, Calif.

Application August 10, 1951, Serial No. 241,207

4 Claims. (Cl. 138—27)

This invention relates to a novel expansible joint particularly adapted for use in pipe lines of water conduits and has for its primary object to provide a joint having an expansible chamber which is capable of being enlarged by an excess pressure created therein by the freezing of water to prevent bursting of the pipe line in sub-freezing weather.

More particularly, it is an aim of the present invention to provide a novel expansible joint capable of being used in long pipe lines due to the fact that the joint is not extended by enlargement of the expansion chamber thereby adapting the expansion joint to water conduits and other pipe lines generally and providing a joint which may be readily interposed at any desired point in a pipe line.

Still another object of the invention is to provide an expansible joint having a sealing means which is held in a sealing position partially by the pressure within the expansion joint and partially by an expansion spring whereby the effectiveness of the sealing means will be increased as the pressure in the expansion joint increases to thereby effectively prevent leakage past the seal without seriously hampering movement of the seal relatively to the stationary parts of the expansion joint.

Still a further object of the invention is to provide an expansion joint of extremely simple construction which is capable of being economically manufactured yet which will be extremely efficient and durable for accomplishing its intended purpose.

Various other objects and advantages of the invention will hereinafter become more fully apparent from the following description of the drawing, illustrating a presently preferred embodiment thereof, and wherein:

Figure 1 is a longitudinal, substantially central sectional view partly in elevation illustrating the expansion joint in an applied position and as it will normally appear when not subjected to excessive pressure;

Figure 2 is a longitudinal sectional view, partly in side elevation showing the expansion joint with the parts as they will appear when the joint is subjected to an excessive pressure as by the freezing of a liquid contained therein, and Figure 3 is a cross sectional view of the expansion joint taken substantially along a plane as indicated by the line 3—3 of Figure 2.

Referring more specifically to the drawing, the novel expansion joint in its entirety is designated generally 5 and is illustrated in Figures 1 and 2 interposed in a portion of a pipe line, such as a water conduit of a city water system a portion only of which has been shown by the adjacent ends of two spaced pipe sections 6 and 7.

The expansion joint 5 includes a length of pipe 8 of substantially larger internal and external diameters than that of the pipe sections 6 and 7. One end of the pipe 8 is threaded into the enlarged end of a reducer coupling 9 and the opposite end of the pipe 8 is similarly threaded into the enlarged end of a similar pipe reducer coupling 10. The reducer couplings 9 and 10 are substantially bell-shaped and have outer restricted internally threaded ends 11 and 12, respectively. The end of the pipe section 6 disposed adjacent the pipe section 7 is threaded into the outer half of the reduced end 11 of the coupling 9 and the adjacent end of the pipe section 7 is threaded into and thereby similarly coupled to the reduced end 12 and the pipe coupling 10.

The expansion joint 5 also includes a length of pipe 13 of substantially the same internal and external diameters as the pipe sections 6 and 7 and which has an externally threaded end 14 which is threadedly engaged in the inner half of the restricted coupling end 11 for supporting the pipe 13 on the coupling 9 and within said coupling and the pipe 8. The pipe 13 is disposed axially of the pipe 8 and has an opposite externally threaded end 15 which terminates in spaced relationship to the ends of the pipe 8.

The pipe 13 extends through a substantially rigid washer 16 which is disposed in and abuts against the intermediate portion of the coupling 9 and which forms a seat for one end of an expansion coiled spring 17 which is disposed around the pipe 13 and within the pipe 8. A nut 18 is threadedly mounted on the threaded pipe portion 15. A pair of rigid washers 19 and 20 is slidably mounted on the pipe 13 and within the pipe 8 between the nut 18 and spring 17 and with the washer 19 disposed nearest the nut 18. A thicker, rigid washer 21 is slidably mounted on the pipe 13 within the pipe 8 between the washer 20 and spring 17 and forms a seat for the end of the spring 17 disposed remote to the spring seat 16. An expansible sealing washer or gasket 22 is mounted on the pipe 13 and within the pipe 8 between the washers 19 and 20 and is preferably formed of rubber and has its periphery bevelled from opposite sides thereof to provide an annular ridge 23 which bears against the inner surface of the pipe 8. The bore of the washer or gasket 22 is similarly bevelled from opposite sides thereof to form a centrally disposed rib or ridge 24 which bears against the outer side of the pipe 13.

The reducer coupling 10 and the portion of the pipe 8 disposed between said coupling 10 and the washer 19 constitutes the expansion chamber 25 of the expansion joint 5. The spring 17 is of sufficient strength to withstand the normal pressure of the water or other liquid, not shown, in the expansion chamber 25 and will accordingly retain the washers 19, 20 and 21 and the sealing washer 22 in the positions as illustrated in Figure 1 and with the washer 19 bearing against the nut 18. The pressure of the spring 17 with the parts thus disposed is sufficient to compress the washer 22 between the washers 19 and 20 with sufficient force to cause the washer 22 to be expanded radially inwardly and outwardly so that its peripheral portion 23 will seat against the inner surface of the pipe 8 and its bore portion 24 will seat against the outer surface of the pipe 13 each sufficiently tight to prevent leakage of the liquid from the expansion chamber 25 into the chamber 26 of the joint 5, which contains the spring 17. When the joint 5 is subjected to sub-freezing temperature causing a freezing of the liquid in the expansion chamber 25, the freezing of the liquid will produce an expansion thereof, the force of which will be exerted at the point of least resistance i. e. against the washer 19 for displacing the washers 19, 20 and 21 and the sealing washer or gasket 22 from left to right from their positions of Figure 1 to or partially to or beyond the positions of said parts as seen in Figure 2, to thereby enlarge the chamber 25 to accommodate the necessary expansion caused by the freezing without bursting the pipe line adjacent the joint 5 or any part of the joint. The pipe 8 is provided with a vent port 27 adjacent the coupling 9 through which air can escape from the chamber 26 as the parts move from their positions of Figure 1 to their positions of Figure 2. It will also be readily apparent that as the pressure builds up in the chamber 25 as the result of the freezing of a liquid contained therein so as to force the washers and sealing gasket from left to right, that this pressure will impinge against the washer 19 so that a greater pressure will be exerted by the washers 19 and 20 on the sealing gasket 22 as the pressure of the spring 17 is also increased as the parts move to the right. This will cause the gasket 22 to be more tightly sealed against the bore of the pipe 8 and the periphery of the pipe 13 to prevent escape of the liquid from the chamber 25 to the chamber 26 as the pressure in the chamber 25 is increased. When the ice melts in the chamber 25 and the pressure is thereby diminished, the spring 17 will return the washers and sealing gasket to their positions of Figure 1 and air will enter the chamber 26 through the vent port 27 to prevent a vacuum being created therein.

Various modifications and changes are contemplated and may obviously be resorted to, without departing from the spirit or scope of the invention as hereinafter defined by the appended claims.

I claim as my invention:

1. The combination with adjacent ends of pipe sections forming a part of a pipe line, of an expansion joint interposed in the pipe line including a pipe of larger internal and external diameters than said pipe sections and disposed therebetween, restrictor couplings connecting said pipe sections to the adjacent ends of the pipe, an inner pipe disposed within said first mentioned pipe and substantially axially thereof having one end secured to the restricted end of one of the couplings and an opposite end disposed intermediate of the ends of the first mentioned pipe, a stop removably mounted on the last mentioned end of the inner pipe, a spring stop mounted on said inner pipe and seated in said aforementioned restrictor coupling, an expansion spring disposed around said inner pipe between the spring stop and said removable stop, a pair of rigid washers slidably disposed on said inner pipe between said expansion spring and said removable stop, and a sealing washer or gasket slidably disposed on the inner pipe between the washers of said pair of washers and compressed by the pressure of said spring between said washers for expanding the sealing gasket radially in both directions into sealing engagement with the periphery of the inner pipe and the bore of said first mentioned pipe to form a chamber between the inner pipe and said first mentioned pipe and between said sealing washer and said aforementioned restrictor coupling which chamber is sealed off from the remainder of said first mentioned pipe, the portion of said first mentioned pipe located between the sealing gasket and the other restrictor coupling forming an expansion chamber, said pair of washers and the sealing gasket being displaced longitudinally of the pipe away from the removable stop by an increased pressure in the expansion chamber and against the action of said expansion spring, for enlarging the expansion chamber.

2. An expansion joint as in claim 1, said first mentioned pipe having a vent port located adjacent the first mentioned restrictor coupling and communicating with said first mentioned chamber for venting said first mentioned chamber to the atmosphere, said sealing gasket being additionally compressed between the pair of washers as the expansion chamber is enlarged by the increased tension on the expansion spring and the increased pressure exerted against one of said rigid washers by the pressure within the expansion chamber to more effectively seal off the expansion chamber from the chamber of the expansion joint having the vent port.

3. An expansion joint as in claim 1, said sealing gasket having a periphery bevelled on opposite sides thereof forming an annular ridge disposed in contact with the bore of said first mentioned pipe.

4. An expansion joint as in claim 3, the bore of said sealing gasket being bevelled on opposite sides thereof to form a continuous internal rib, said internal rib contacting the periphery of said inner pipe and combining with said annular ridge of the sealing gasket to permit the sealing gasket to slide more readily longitudinally of the expansion joint.

WILLARD L. KINGSTON.

References Cited in the file of this patent

UNITED STATES PATENTS

| Number | Name | Date |
|---|---|---|
| 594,070 | Fahr | Nov. 23, 1897 |
| 696,277 | Sponseller et al. | Mar. 25, 1902 |
| 881,687 | Hoffner | Mar. 10, 1908 |
| 966,748 | Honecker | Aug. 9, 1910 |
| 1,536,531 | Schermann | May 5, 1925 |
| 2,056,076 | Le Blanc | Sept. 29, 1936 |

FOREIGN PATENTS

| Number | Country | Date |
|---|---|---|
| 573,194 | Great Britain | Nov. 9, 1945 |